United States Patent [19]

Biörnstad et al.

[11] 4,074,624
[45] Feb. 21, 1978

[54] METHOD OF ADJUSTING THE CONTACT PRESSURE OF A ROLLING MILL AND APPARATUS FOR THE PERFORMANCE THEREOF

[75] Inventors: Peter Biörnstad, Zurich; Anton Dolenc, Winterthur, both of Switzerland

[73] Assignee: Escher Wyss Limited, Zurich, Switzerland

[21] Appl. No.: 742,366

[22] Filed: Nov. 15, 1976

[30] Foreign Application Priority Data

Dec. 8, 1975 Switzerland .................... 15950/75

[51] Int. Cl.² .................... B30B 13/00; B21B 13/02; B30B 3/04
[52] U.S. Cl. .................... 100/35; 29/116 AD; 72/20; 72/243; 100/170
[58] Field of Search ............... 100/35, 47, 162 B, 170, 100/176; 72/20, 241, 243; 29/113 R, 113 AD, 116 R, 116 AD

[56] References Cited

U.S. PATENT DOCUMENTS

| 3,084,314 | 4/1963 | Ziffer | 100/47 X |
| 3,119,324 | 1/1964 | Justus | 100/170 |
| 3,667,283 | 6/1972 | Takenaka | 73/37.7 |
| 3,921,514 | 11/1975 | Biondetti | 100/170 |
| 4,023,480 | 5/1977 | Biondetti | 100/47 |

*Primary Examiner*—Edward J. McCarthy
*Attorney, Agent, or Firm*—Werner W. Kleeman

[57] ABSTRACT

A method of, and apparatus for, adjusting the contact pressure of a rolling mill for rolling a web of material, the rolling mill comprising at least one controlled deflection roll equipped with a plurality of hydrostatic pressure elements operable by means of a hydraulic pressure medium. After the web of material has passed through the rolling mill the action of such rolling mill upon the web of material is measured at a number of points or locations across the web and the pressure of the pressure medium supplied to the individual pressure elements associated with the measuring points or locations is adjusted as a function of the measured values such that there is obtained a desired reference value for the action of the rolling mill at the measuring points or locations.

15 Claims, 10 Drawing Figures

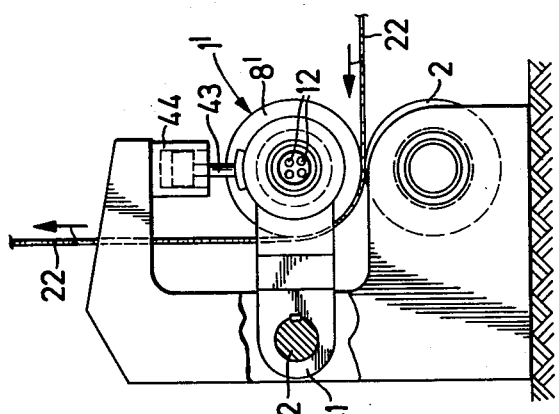
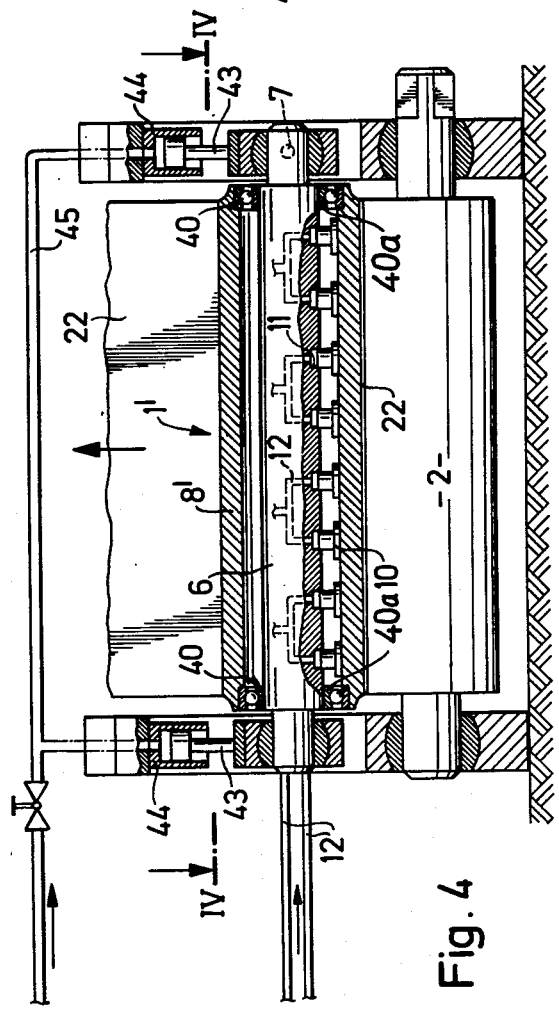
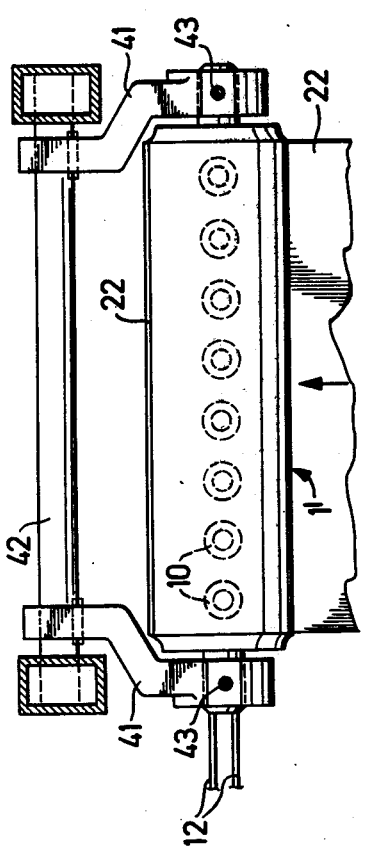
Fig. 5
Fig. 6
Fig. 4

METHOD OF ADJUSTING THE CONTACT PRESSURE OF A ROLLING MILL AND APPARATUS FOR THE PERFORMANCE THEREOF

BACKGROUND OF THE INVENTION

The present invention relates to a new and improved method of adjusting the contact pressure of a rolling mill for rolling a web of material, the rolling mill comprising at least one controlled deflection roll equipped with a plurality of hydrostatic pressure elements operated by means of a hydraulic pressure medium. The invention further relates to apparatus for the performance of the aforesaid method.

Controlled deflection rolls — also sometimes referred to as rolls with bending compensation — equipped with hydrostatic pressure elements are known to the art, for instance, from British Pat. No. 641,466 and U.S. Pat. Nos. 3,119,324 and 3,802,044. With these constructions of rolls, a rotatable roll shell is supported upon pressure elements in the form of pistons, which are guided at a stationary central support extending through the shell. The piston-like elements may be guided either in cylindrical bores provided in the support or a part connected therewith, or else each such piston-like pressure element may itself contain the cylindrical bore and be guided upon a respective associated pin-like projection provided at the support, typically for instance as shown in FIG. 4 of the aforementioned U.S. Pat. No. 3,802,044, the disclosure of which is incorporated herein by reference. These prior art controlled deflection rolls allow for the required deformation of the roll shell irrespective of the flexure or deflection of its support.

SUMMARY OF THE INVENTION

A primary object of the present invention is to improve upon the heretofore known rolling mills of this type, and to provide a method and apparatus enabling optimum utilization of the properties of the controlled deflection roll.

In keeping with this objective, the invention further contemplates realizing with the aid of simple means a desired profile of the web characteristics influenced by the rolling mill in the transverse direction of the web.

Now in order to implement these and still further objects of the invention, which will become more readily apparent as the description proceeds, the method aspects of this development are manifested by the features that the action of the rolling mill upon the web of material, after the latter has passed through the rolling mill, is measured at a number of points across the web, then the pressure of the pressure medium supplied to the individual pressure elements associated with the measuring points is adjusted in accordance with the measured values in a manner such as to provide a desired reference or set value for the action of the rolling mill at the measuring points.

Thus, with a suitable resilience or flexibility of the roll shell, it is possible to maintain the desired properties of the web at the different locations or points across its transverse direction. For instance, it is possible to measure the thickness of a web which has been rolled in the rolling mill, and such measurement can be accomplished either directly mechanically or, for instance, by reference to electrical characteristics. In the case of rolling mills used in paper-making machines, it is possible to measure the thickness of a paper web, its moisture or its hardness. Furthermore, it is also possible to measure the smoothness of plastic or paper webs, and the insulation resistance or dye absorbency of coated webs and so forth.

The pressure of the pressure medium acting at all of the pressure elements may be individually adjusted. In this manner, the adaptability of the controlled deflection roll to the requirements of the material web can be optimumly utilized.

As an alternative arrangement, the roll may comprise a number of groups of adjacent pressure elements, to each of which the pressure medium is delivered at a common pressure which is adjusted as a function of the measured value. Thus, in the case of a roll having a relatively large number of pressure elements, there is possible considerable simplification, because since the pressure elements are combined into groups a smaller number of infeed conduits is required, and, thus, also fewer or simpler control systems and regulators.

Continuing, the apparatus for the peformance of the aforesaid method is manifested by the feature that there is provided at least one measuring system or device for measuring a web characteristic which can be influenced by the contact pressure of the rolling mill, at measuring points distributed along at least part of the width of the web. A regulator device serves to adjust the pressure of the pressure medium delivered to the pressure elements as a function of the measurement values derived at the associated measuring points. An apparatus of this type affords optimum operation of the rolling mill while fully utilizing the adaptability of each controlled deflection roll which has been provided. Any deviations at the individual locations in the transverse direction of the material web can be immediately and automatically compensated by carrying out a direct control of the individual pressure elements or groups of pressure elements.

When needed, a number of measuring elements can be provided, each of which then is operatively associated with a section of the width of the material web. As already mentioned, these measuring elements may be, for example, mechanical thickness gauges, or alternatively electrical or optical measuring elements, or further, measuring elements responsive to nuclear radiation.

However, according to a further modification of the invention, the measuring device or system also can embody a measuring element movable transversely with respect to the material web, and a device for correlating the measuring or measurement values of individual sections of the width of the web to the corresponding pressure elements or groups of pressure elements, as the case may be. Such type construction is especially suitable in those instances where the measuring element is relatively complicated and expensive, such as, for example, in the case of a measuring element for measuring the relative moisture of a paper web with the aid of nuclear radiation.

A measuring device of this type may be preferably provided with an integrating system for forming a mean value from the values measured at the individual sections of the web width. In such case, the measuring element for the associated width section of the web can form measuring signals which are beneficially employed for adjusting the pressure of the associated pressure elements.

The controlled deflection roll also can contain external pressure cylinders, to which there is delivered a constant contact pressure for determining the mean linear pressure of the rolling mill, and the course of the linear pressure along the roll is accomplished by acting upon the pressure elements as a function of the measuring values at the measuring locations. In such case, the contact pressure cylinders can determine the entire contact pressure of the roll independent of pressure variations in the individual pressure elements. The required curvature of the roll shell or other deformation, according to operating requirements, then is accomplished by appropriately controlling the pressure elements.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is a front view, partly in cross-section, of another embodiment of rolling mill constructed according to the invention;

FIG. 5 is an end view of the arrangement of FIG. 4;

FIG. 6 is a top plan view, partly in section, of part of the arrangement of FIG. 4;

DETAILED DESCRIPTION OF THE PREFERRED EMBODIMENTS

Figure 1:
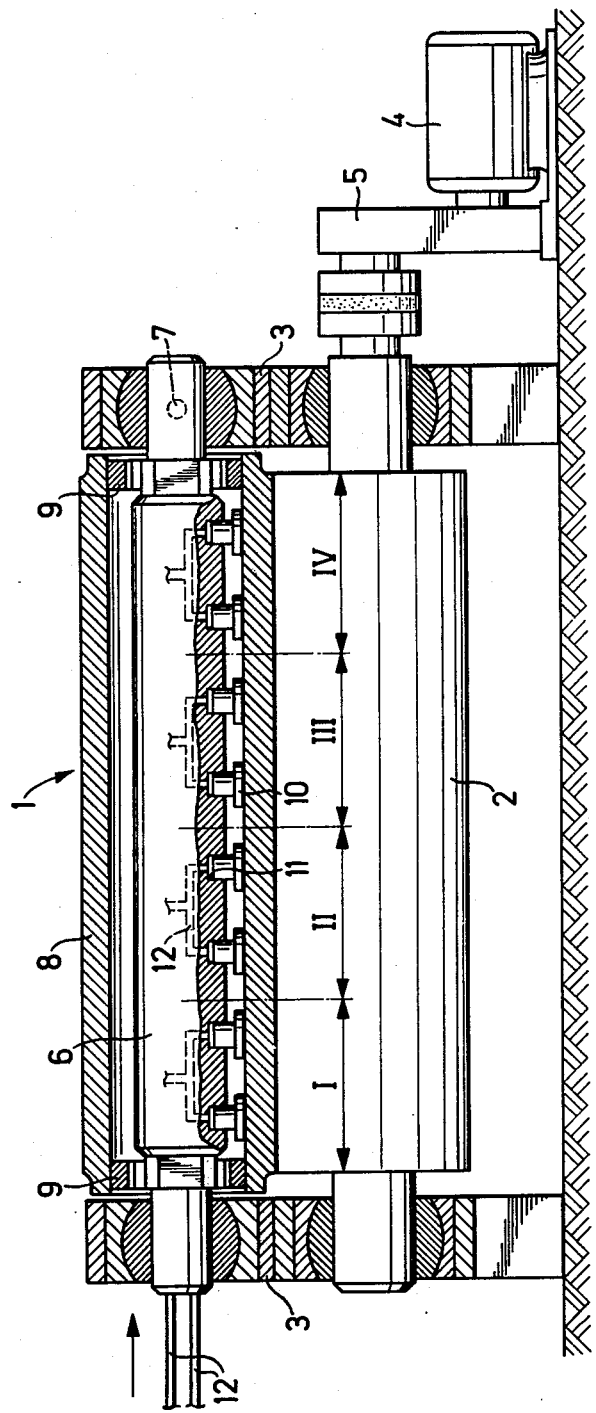
FIG. 1 is a schematic view, partly in cross-section, of a rolling mill constructed according to the invention, and useful in the performance of the method aspects.

Describing now the drawings, it is to be recognized that throughout the various Figures there has been illustrated enough of the structure of a rolling mill to enable those skilled in the art to readily understand the underlying teachings and concepts of the invention. Turning attention specifically to the embodiment of FIG. 1 there is shown a rolling mill comprising a controlled deflection roll 1 and a coacting or counter-roll 2, each of which are journaled and supported in a frame 3 in conventional fashion. The counter-roll 2 is driven by a suitable drive motor 4 through the intermediary of a transmission 5. The controlled deflection roll 1 embodies a fixed support 6 in the form of a shaft carried by the frame 3, this support 6 being secured against rotation by means of a pin 7 or equivalent structure. A roll shell 8 is rotatable about the support 6 and is supported at the piston-like support elements 10 constituting pressure elements. These support elements 10, which may be constructed in the manner disclosed in U.S. Pat. No. 3,802,044 previously referred to, are sealingly guided in bores 11 provided at the support 6 and are exposed to the action of a hydraulic pressure medium delivered to these bores 11 by means of the conduits or lines 12. To preserve clarity in illustration, FIG. 1 simply portrays eight pressure or support elements 10 combined into four groups I – IV by means of the conduits 12, with each such group containing two pressure elements. The roll shell 8 is movably guided at its ends with the aid of the parallel guides 9 upon the support 6 in the plane of the pressure elements 10.

Of course it is self-evident that a different, especially a larger number of pressure elements can be provided, and the groups can contain more than two pressure elements. On the other hand, the pressure elements also could be individually connected to a pressure source or pressure sources. At least three independently actuated pressure elements or groups of pressure elements may be preferably provided.

Figure 2:
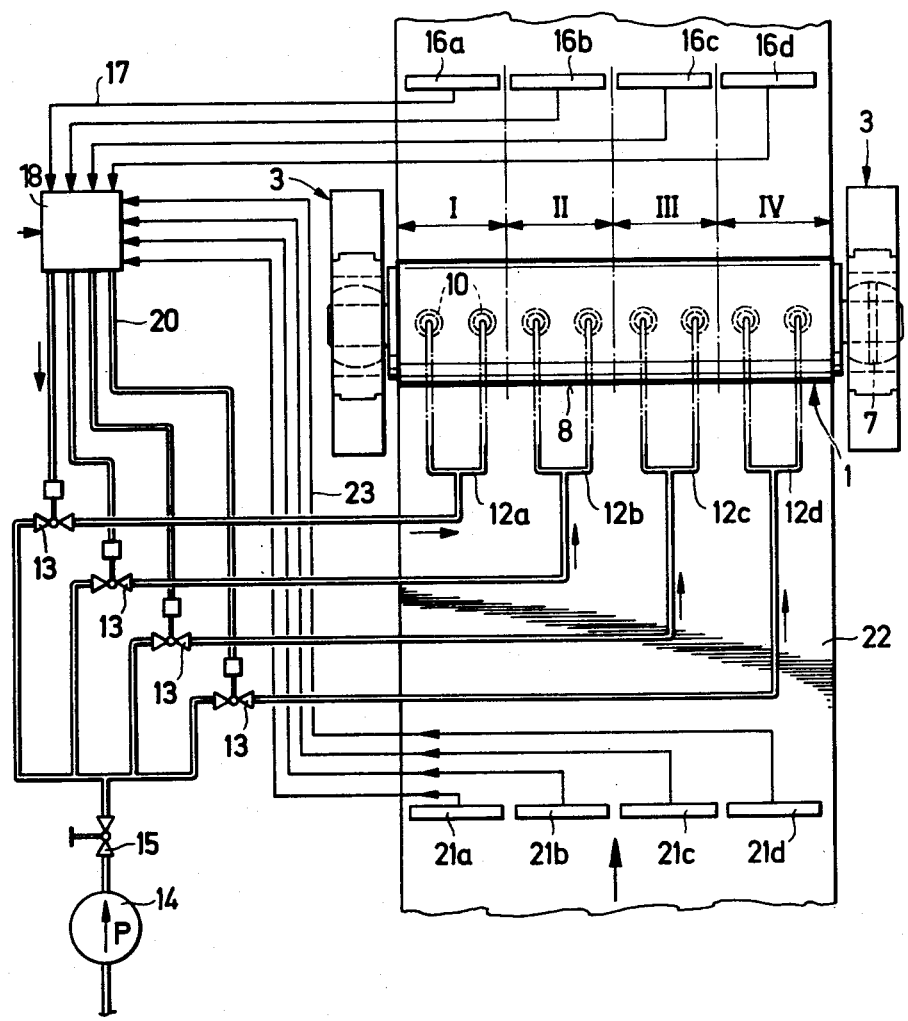
FIG. 2 is a control circuit of an apparatus constructed according to the present invention for performing the method.

FIG. 2 illustrates a possible constructional embodiment of a control circuit for a regulating or control system of a rolling mill of the type shown in FIG. 1. Here, the rolling mill has been conveniently illustrated in top plan view, so that there is only visible the controlled deflection roll 1 located at the top. The individual pressure elements 10 are connected with the conduits or lines 12a, 12b, 12c, and 12d. To improve clarity in illustration, the conduits have been shown extending downwardly in the drawing although in actual fact, they extend through the support 6 of the roll 1 towards the outside, in the manner portrayed in FIG. 1 by the conduits 12. The conduits 12a – 12d are connected by means of servomotor-actuated control or regulating valves 13 with a suitable pressure medium supply, for example, a pump 14. This pump 14 can be provided in conventional fashion with any suitable and therefore not particularly illustrated device for regulating its pressure. Equally, a regulating valve 15 can be arranged downstream of the pump 14.

Additionally, the apparatus illustrated in FIG. 2 is equipped with a suitable number of measuring or measurement elements 16a, 16b, 16c, and 16d, for instance in the form of electrodes of an electro-static measuring device. These measuring elements 16a, 16b, 16c, and 16d are connected by means of the signal lines or conductors 17, with a regulator or controller 18 constituting for instance a comparator. Regulators or controllers suitable for the purposes of the invention are well known in the art, for instance, as discussed in ASME Standard 105, "Automatic Control Terminology," 1654, the disclosure of which is incorporated herein and to which reference may be readily had. As mentioned, the regulator 18 can be constituted by a conventional comparator which compares the signals received from the signal lines 17 with reference or set values and whenever a deviation is present an error or correction signal is delivered to correct the system as desired. To that end, it will be seen that leading from the regulator 18 to the valves 13, are the output signal lines 20.

Apart from the above structure, the measuring device also can contain the measuring elements 21a, 21b, 21c, and 21d, which can be constructed in the same manner as the measuring elements 16a, 16b, 16c, and 16d, but, viewed in the direction of travel of the web 22, are arranged in front of, i.e., upstream of the rolls 1 and 2. Signal lines 23 lead from the measuring elements 21a, 21b, 21c, and 21d to the regulator 18.

As is conventional in the control engineering art, signals emanating from the measuring elements 16a, 16b, 16c, and 16d are used for the actual control or regulation of the system to the required measuring value, whereas the measuring elements 21a, 21b, 21c and 21d constitute parts of a pre-control enabling rapid reaction of the regulator 18, since any disturbances appearing at the rolls 1,2 are detected well ahead of time. The measuring elements 16a – 16d and the measuring elements 21a – 21d are located at the sections or regions I – IV of the material web 22, corresponding to the groups I – IV, a best seen by referring to FIG. 2.

During operation of the system, the web 22, which for instance may be a paper web, a textile web, a plastic- or metalic web, moves between the nip of the rolls 1 and 2 of the rolling mill. In the rolling mill, the web has imparted thereto the desired properties, for instance thickness, smoothness, moisture content and so forth, these properties being dependent upon the contact pressure of the individual pressure elements 10.

The web property influenced in the rolling mill, for instance, the web thickness is measured by the measuring elements 16a, 16b, 16c, 16d, and the regulator 18 influences by means of the regulating or control valves 13 the pressure of the medium delivered to the pressure elements 10 in such a manner that there are obtained the desired values.

Variations in the relevant property of the web 22, for instance the thickness of the portion of the web located in front of the rolls 1, 2 of the rolling mill, are measured by the measuring elements 21a, 21b, 22c, and 21d, and the measured values delivered to the regulator 18. This regulator 18 brings about a corresponding change in the pressure prevailing in the conduits 12a, 12b, 12c, and 12d, thereby appropriately influencing the relevant property of the web 22, for instance as assumed its thickness.

Figure 3:
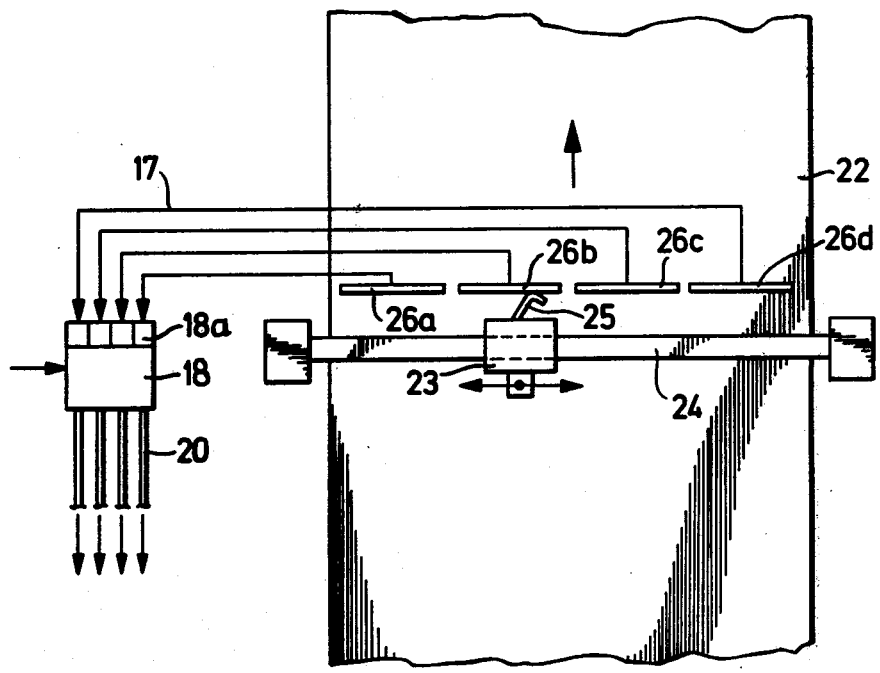
FIG. 3 is a fragmentary view showing a detail of the arrangement of FIG. 2 but employing a different construction of the measuring device.

FIG. 3 illustrates a detail of the arrangement of FIG. 2, however using a measuring device employing a measuring element 23 movable transversely with respect to the web 22. The measuring element 23 is guided upon a rail 24 and possesses a sliding contact 25, by means of which its measuring signal can be delivered via the stationary contact rails 26a, 26b, 26c and 26d to the signal lines or conductors 17. Otherwise, this device operates in the same manner as the system of FIG. 2. Here, the regulator 18 must be equipped however with integrating means operatively associated with the individual signal lines 17, and forming in each case a mean value of the signal at the region of the corresponding individual contact rails 26a, 26b, 26c, and 26d.

Continuing, FIGS. 4 – 6 illustrate a rolling mill comprising a controlled deflection roll 1', the roll shell 8' of which is provided at its ends with the roller bearings 40. The inner races 40a are secured to the support 6. Arms 41 of a connecting shaft 42 engage the ends or journals of the support 6. These arms 41 are secured against rotation on the shaft 42 in any convenient manner. Piston rods 43 of hydraulic piston and cylinder arrangements 44 engage the other ends of the arms 41, as best seen by referring to FIGS. 4 and 5. A suitable pressure medium can be simultaneously supplied to these piston and cylinder arrangements 44 by means of a pressure line 45.

Otherwise, the controlled deflection roll 1', just as was the case for the roll 1 of FIGS. 1 and 2, is likewise provided with the pressure elements 10 to which there is delivered the pressure medium by means of the conduits or lines 12, and specifically the lines 12a – 12d when there is assumed an arrangement as shown in FIG. 2.

With the apparatus or system illustrated in FIGS. 4 – 6 the controlled deflection roll 1' can be pressed with a desired contact pressure or force against the coacting or counter-roll 2 by means of the piston and cylinder arrangements 44. The course of such contact force or pressure transversely of the web 22, can be affected in the manner described previously during the discussion of the apparatus structure of FIG. 2.

Figure 7:
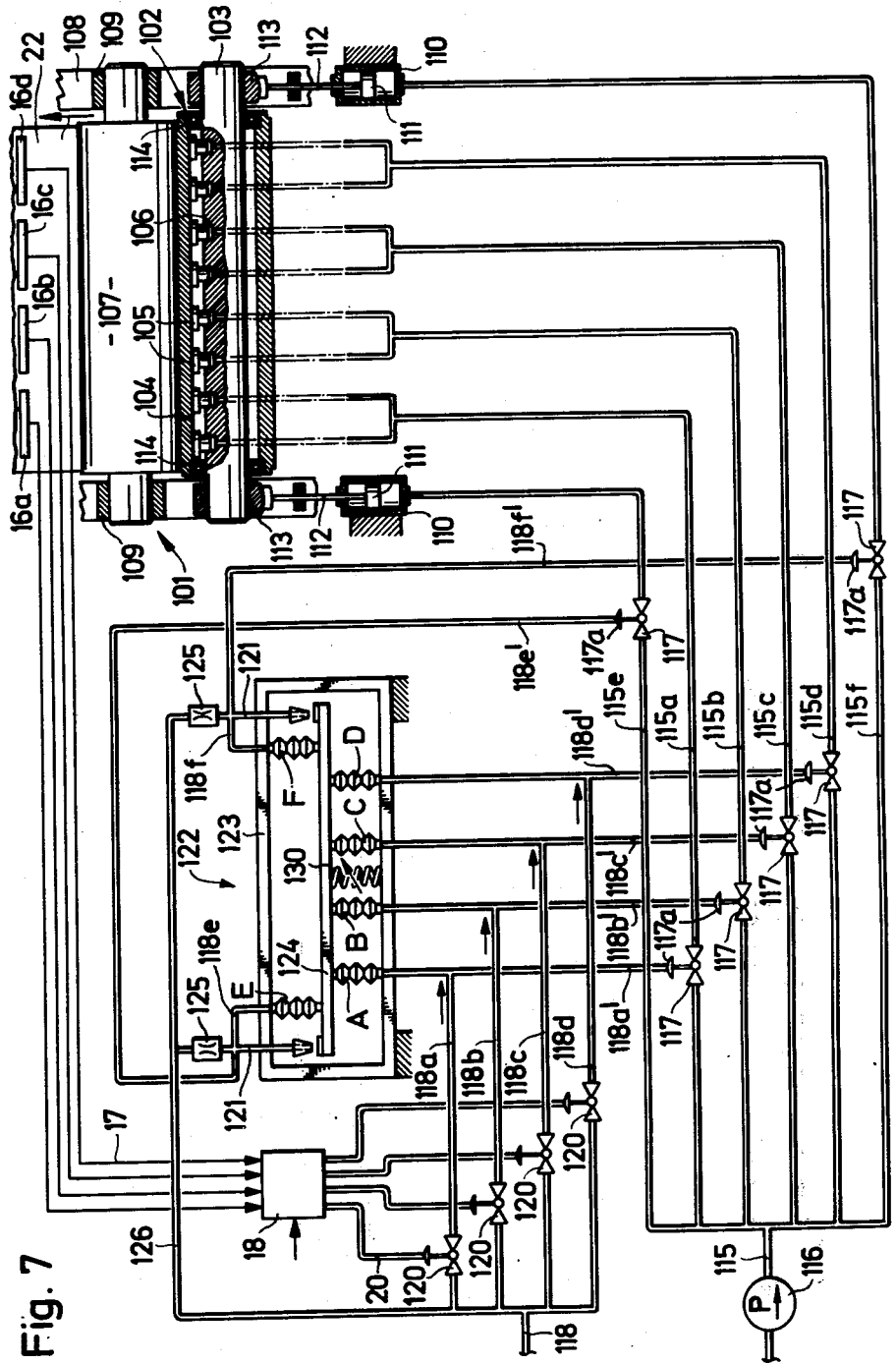
FIG. 7 is a control circuit of another embodiment of the present invention.

Continuing, in FIG. 7 there is illustrated a rolling mill 101 comprising a controlled deflection roll 102 containing a support 103 in the form of a shaft, a roll shell 104 rotatable about such support 103, and hydrostatic pressure elements 105. The pressure elements 105 are of a piston-like construction, as disclosed in the aforementioned U.S. Pat. No. 3,802,044, and are guided for instance in the cylindrical bores 106 provided at the support 103. Cooperating with the controlled deflection roll 102 is a counter-roll 107 which is rotatably mounted in fixed bearings 109 in frame 108.

For the purpose of pressing the roll 102 against the coacting or counter-roll 107, there are provided the hydraulic cylinders 110 in which there are sealingly guided the pistons 111, the pistons rods 112 of which are supported at the guide elements 113. It will be seen that the guide elements 113 are arranged at opposed ends of the shaft-like support 103, and thus, the piston rods 112 in conjunction with the guide elements 113 guide the support 103 in the frame 108. Further, it will be recognized from the showing of FIG. 7 that roller bearings 114 are provided between the ends of the roll shell 104 and the support 103.

The cylindrical bores or cylinders 106 of the support 103 are connected with the branch conduits or lines 115a, 115b, 115c, and 115d of a delivery line or conduit 115 of a pump 116 for delivering a hydraulic pressure medium. Both of the cylinders 110 are connected with branch lines or conduits 115e and 115f of the same delivery line 115. In the branch lines 115a–115f, there are located the respective pneumatically actuated pressure control or regulating valves 117. The pneumatic parts 117a of these control valves 117 are connected with the pneumatic control lines 118a – 118f which include the control line sections or portions 118a' to 118f' respectively. The pneumatic control lines 118a, 118b, 118c and 118d lead from a compressed air line or conduit and as shown at the left-hand side of FIG. 7, in each of the pneumatic control lines 118a, 118b, 118c, and 118d there is provided a respective pressure regulating or control valve 120. The control lines 118e and 118f lead from the respective blow tubes 121 of a regulating device 122 containing a housing 123 and a beam-like component 124 movably arranged therein. Between the housing 123 and the beam-like component 124, there are located the bellows A, B, C, D, E, and F. The bellows A, B, C, and D are connected with the control lines 118a, 118b, 118c and 118d respectively. The bellows E is connected with the control line 118e and the associated blow tube 121. Similarly, the bellows F is connected with its control line 118f and likewise its associated blow tube 121.

The blow tubes 121 are connected via the throttle valves 125 with a common compressed air conduit or line 126.

The relationships between the rolling mill 101 and the regulating or control device 122 are selected such that the beam-like component 124 together with the bellows A – F serves for simulating the forces which are operative in the rolling mill 101. To this end, for example, the forces represented by the bellows and their lever arms can be proportional to the forces and lever arms in the rolling mill 101. Under these conditions, the forces of the bellows A, B, C, D in each case correspond to the resultant force of a group of pressure elements 105. Further details of such arrangement constitute subject matter of the commonly assigned, copending U.S. application Ser. No. 661,566, filed Feb. 26, 1976, U.S. Pat. No. 4,023,480 which may be referred to and the disclosure which is incorporated herein by reference.

With the arrangement of FIG. 7, there is also provided in the same manner as for the arrangement of FIG. 2 a regulator 18 which cooperates with the measuring elements 16a, 16b, 16c, and 16d. The output lines 20 of the regulator 18 act upon the pneumatic valves 120 which, in turn, control the pressure regulating or control valves 117. The function therefore will be readily understood from the description of FIG. 2 heretofore given.

Figure 8:
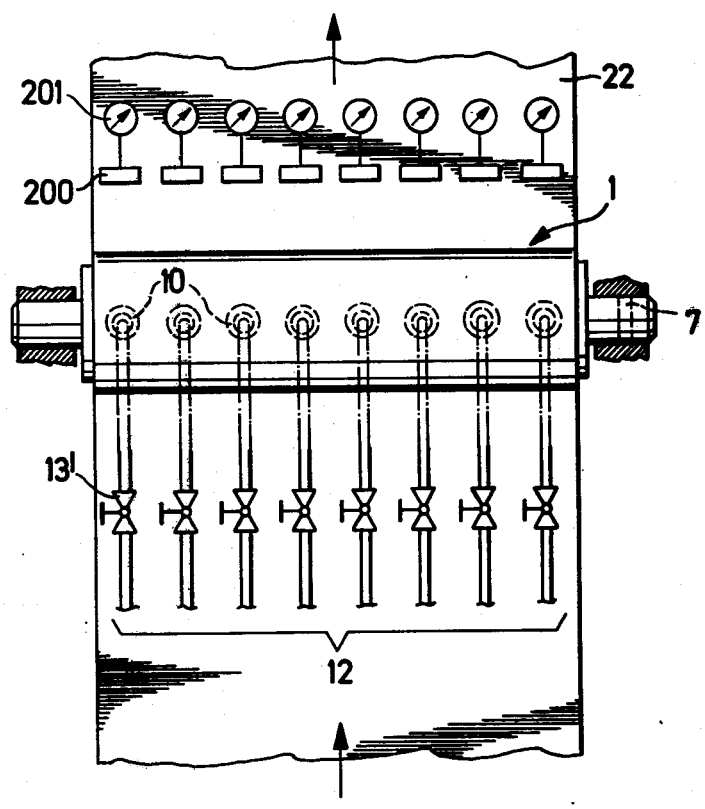
FIG. 8 illustrates a manually operated apparatus constructed according to the invention.

In FIG. 8 there is illustrated an embodiment of a rolling mill which is suitable for manual operation for the performance of the method of this invention. The rolling mill, which may be constructed in the manner shown and described heretofore with reference to FIGS. 1 or 2, comprises a controlled bending roll 1 similarly constructed as the roll 1 of the prior embodiments of FIGS. 1 and 2, and only differs by virtue of the fact that in this case the pressure elements 10 are individually connected with the hydraulic pressure lines 12. Each of the pressure lines or conduits 12 contains a manually operable regulating or control valve 13', as shown. Extending transversely of the web is a series of measuring elements 200, each equipped with a readable indicator element 201.

In order to perform the process of the invention, it is sufficient for the embodiment of FIG. 8 to read-off the measured values at the individual indicator elements 201 and to actuate the valves 13' of the pressure elements 10 associated with the corresponding measuring elements.

Figure 9:
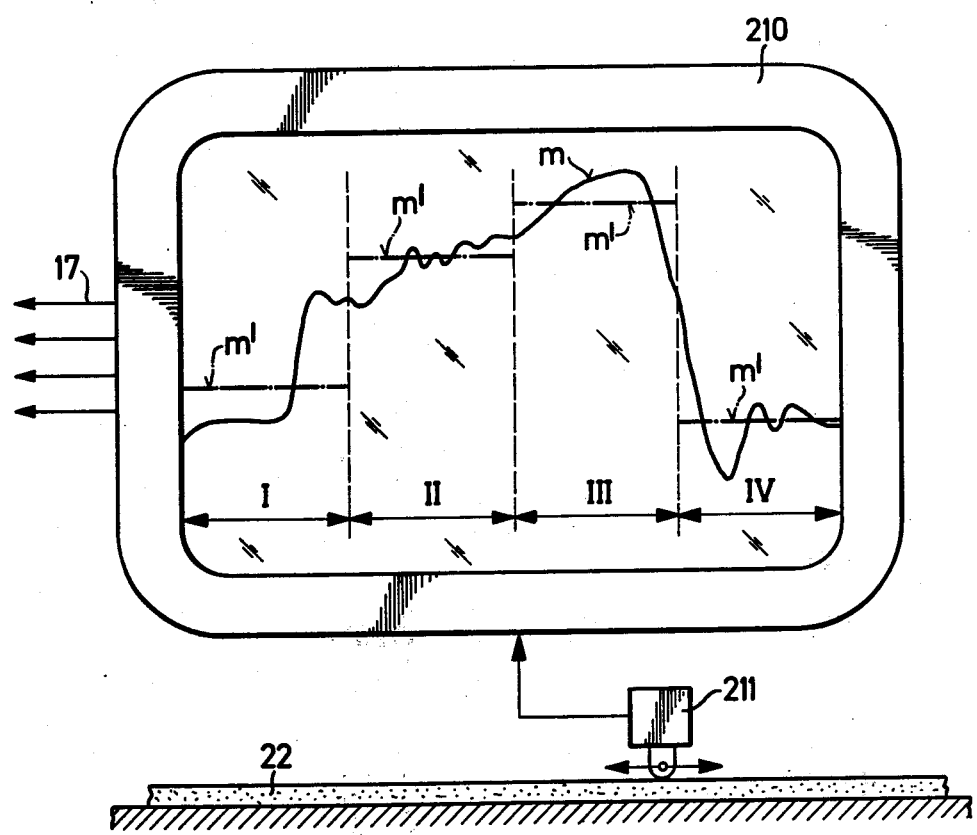
FIG. 9 schematically illustrates an apparatus operating in the same manner as the measuring device of FIG. 3; and, FIG. 10 is a schematic sectional view of a further exemplary embodiment of rolling mill employing a controlled deflection roll and constructed according to the principles of the present invention.

FIG. 9 schematically illustrates an electronic apparatus corresponding to the measuring device of FIG. 3 in terms of its function. The measuring device 210 illustrated in FIG. 9 will be seen to contain a measuring head 211 which, like the measuring element 23 of the arrangement of FIG. 3, moves to-and-fro transversely of the web width. The measuring head 211, during each throughpass, forms a signal in the measuring device 210 which is recorded in a suitable manner and stored and can be portrayed, as shown in FIG. 9, by a line $m$.

After the pass of the measuring element 23, the signal is divided into the sections I, II, III, and IV, corresponding to the groups I, II, III, and IV respectively of the arrangements of FIGS. 1 and 2, and at the individual sections there are formed the mean or average values $m'$ of the signal. These mean values, indicated in FIG. 9 by chain-dot lines, are then fed to the regulator 18 via the lines or conductors 17.

Figure 10:
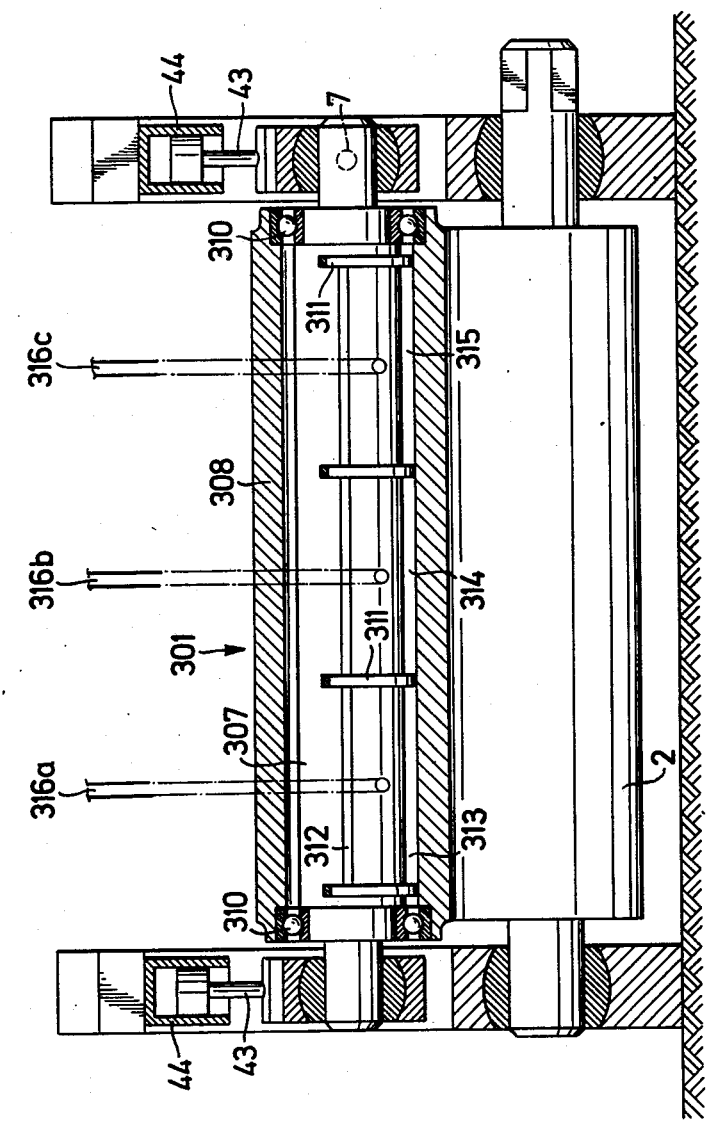

Finally, in FIG. 10 there is shown similar to the arrangement of FIG. 4, an embodiment of a rolling mill equipped with a roll having hydrostatic pressure elements. which is likewise suitable for performing the invention. The controlled deflection roll 301 of FIG. 10 again contains a support 307 in the form of a shaft, about which there is rotatable a roll shell or drum 308. The roll shell 308 is rotatably mounted in roller bearings 310 or equivalent structure at the support 307.

Between the support 307 and the roll shell 308 there are arranged seals 311 extending in the peripheral direction and also seals 312 extending in the longitudinal direction of the roll. These seals 311, 312 bound the pressure chambers or compartments 313, 314, and 315. The pressure chambers 313, 314, and 315, which in this case form the pressure elements which can be actuated independently of one another, are connected by means of the lines or conduits 316a, 316b, and 316c, at a suitable source of pressure medium which, like the arrangement of FIG. 2, can be constituted by the pump 14. Here also, regulating or control valves, for instance corresponding to the valves 13 of the arrangement of FIG. 2, can be provided for the conduits or lines 316a, 316b, and 316c. Furthermore, the connection of the measuring elements and the regulator can be accomplished in the same manner as for the embodiment of FIG. 2.

Obviously, modifications from the exemplary embodiments shown herein are possible without departing in any way from the underlying principles and teachings of the invention. Thus, for instance, the number and construction of the measuring elements can be different from that shown, and equally, as already mentioned, the pressure elements can be arranged in groups, each containing a desired number, or individually depending upon the requirements of the rolling mill.

While there are shown and described present preferred embodiments of the invention, it is to be distinctly understood that the invention is not limited thereto, but may be otherwise variously embodied and practiced within the scope of the following claims.

Accordingly, what is claimed is:

1. A method of adjusting the contact pressure of a rolling mill for rolling a web of material, comprising the steps of:
   providing at least one pair of rolls comprising at least one controlled deflection roll equipped with a plurality of hydrostatic pressure elements operable by a hydraulic pressure medium and a counter-roll cooperating with said controlled deflection roll;
   passing a web of material through the nip between the controlled deflection roll and the counter-roll;
   measuring at a number of measuring locations across the web of material the action of the pair of rolls upon the throughpassing web of material after the web of material has departed from the nip of the pair of rolls to form measured values characteristic of such action of the pair of rolls; and,
   adjusting the pressure of the pressure medium fed to the individual pressure elements associated with the measuring locations in accordance with said measured values so as to obtain a required reference value at the measuring locations.

2. The method as defined in claim 1, further including the step of:
   individually adjusting the pressure of the pressure medium fed to each of the pressure elements.

3. The method as defined in claim 1, further including the steps of:
   subdividing the pressure elements into a predetermined number of groups, each group being associated with a corresponding measuring location; and
   supplying to each said group of pressure elements a pressure medium delivered at essentially the same pressure adjusted as a function of the measured value at its corresponding measuring location.

4. The method as defined in claim 1, further including the steps of:
measuring a given property of the web of material at a location upstream of the pair of rolls with respect to the direction of travel of the web of material to form further measured values; and
pre-controlling the controlled deflection roll by means of said further measured values.

5. A method of adjusting the contact pressure of a rolling mill for rolling a web of material, comprising the steps of:
providing at least one pair of rolls comprising at least one controlled deflection roll equipped with a plurality of pressure elements operable by a pressure medium and a counter-roll cooperating with said controlled deflection roll;
passing a web of material through the nip between the controlled deflection roll and the counter-roll;
measuring at a number of measuring locations across the web of material, downstream of the nip of the pair of rolls with respect to the direction of travel of the web of material, the action of the pair of rolls upon the throughpassing web of material to thereby obtain measured values; and
regulating the pressure of the pressure medium supplied to the pressure elements associated with the measuring locations as a function of the measured values so as to establish a required set value at each of the measuring locations.

6. An apparatus for adjusting the contact pressure of a rolling mill for rolling a web of material, comprising:
at least one controlled deflection roll;
said controlled deflection roll including a plurality of hydrostatic pressure elements;
means for supplying a hydraulic pressure medium to said hydrostatic pressure elements;
a counter-roll;
means for mounting said controlled deflection roll and said counter-roll in cooperating relationship to define therebetween a nip through which passes the web of material undergoing rolling;
at least one measuring device for measuring a web characteristic which can be influenced by the pressure of the cooperating pair of rolls at measuring locations distributed along at least part of the width of the web; and
means for adjusting the pressure of the pressure medium supplied to the pressure elements as a function of measured values derived by the measuring device at the associated measuring locations.

7. The apparatus as defined in claim 6, where said measuring device comprises:
a plurality of measuring elements, each measuring element being operatively associated with a section of the width of the web.

8. The apparatus as defined in claim 6, wherein said measuring device comprises:
a measuring element;
means mounting said measuring element to be movable transversely of the web of material; and
means for correlating the measured values of individual sections of the width of the web with the corresponding pressure elements.

9. The apparatus as defined in claim 8, wherein said adjusting means comprises:
integrating means for forming a mean value of the measured values at the individual sections of the width of the web.

10. The apparatus as defined in claim 6, wherein said measuring device comprises:
a measuring element;
means mounting said measuring element to be movable transversely of the web of material;
said pressure elements being arranged in groups, each group containing a given number of said pressure elements; and
means for correlating the measured values of individual sections of the width of the web with the corresponding groups of pressure elements.

11. The apparatus as defined in claim 10, wherein said adjusting means comprises:
integrating means for forming a mean value of the measured values at the individual sections of the width of the web.

12. The apparatus as defined in claim 6, further including:
external pressure cylinder means provided for said controlled deflection roll;
means for delivering a pressure medium producing a substantially constant contact pressure of said controlled deflection roll with said counter-roll for determining a mean linear pressure of the cooperating pair of rolls; and
said adjusting means controlling the pressure elements as a function of the measured values at the corresponding measuring locations in order to control the course of the linear pressure along the controlled deflection roll.

13. The apparatus as defined in claim 6, wherein said plurality of pressure elements comprises:
at least three independently operable pressure elements.

14. The apparatus as defined in claim 6, wherein said plurality of pressure elements comprises:
a predetermined number of groups of such pressure elements.

15. An apparatus for adjusting the contact pressure of a rolling mill for rolling a web of material, comprising:
at least one controlled deflection roll;
said controlled deflection roll including a plurality of pressure elements;
means for supplying a pressure medium to said pressure elements;
a counter-roll;
means for mounting said controlled deflection roll and counter-roll in cooperating relationship to define therebetween a nip through which passes the web of material;
measuring means for measuring a web characteristic which can be influenced by the pressure of the cooperating pair of rolls at one or more measuring locations distributed along at least part of the width of the web; and
means for adjusting the pressure of the pressure medium supplied to the pressure elements as a function of measured values determined by the measuring means at the measuring locations.

* * * * *